United States Patent
Boyer et al.

(10) Patent No.: US 6,337,882 B1
(45) Date of Patent: *Jan. 8, 2002

(54) METHOD AND APPARATUS FOR GENERATING UNLIMITED SELECTED IMAGE VIEWS FROM A LARGER IMAGE

(75) Inventors: David Gray Boyer, Oceanport; Vishvjit Singh Nalwa, Middletown, both of NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,143

(22) Filed: Mar. 6, 1998

(51) Int. Cl.$^7$ ................................................ H04N 7/12
(52) U.S. Cl. .......................... 375/240.24; 375/240.25; 375/240.26; 375/240.29
(58) Field of Search ............................. 375/240, 240.24, 375/240.25, 240.26, 240.29; 348/6–18, 12–15, 384, 390, 397–398, 399, 400–408, 420, 438, 575, 588; 382/233, 243–246, 248–250; 386/109, 111–112; 358/426

(56) References Cited

U.S. PATENT DOCUMENTS

| | | | |
|---|---|---|---|
| 5,122,873 A | 6/1992 | Golin | 348/390 |
| 5,128,776 A * | 7/1992 | Scorse et al. | 358/426 |
| 5,179,651 A * | 1/1993 | Taaffe et al. | 345/202 |
| 5,235,420 A | 8/1993 | Gharavi | 348/398 |
| 5,262,855 A | 11/1993 | Alattar et al. | 348/424 |
| 5,432,871 A * | 7/1995 | Novik | 382/232 |
| 5,481,297 A | 1/1996 | Cash et al. | 348/385 |
| 5,533,138 A | 7/1996 | Kim et al. | 348/403 |
| 5,623,308 A | 4/1997 | Civanlar et al. | 348/423 |
| 5,666,487 A | 9/1997 | Goodman et al. | 348/384 |
| 5,710,835 A * | 1/1998 | Bradley | 382/233 |
| 5,774,597 A * | 6/1998 | Wilson | 382/250 |
| 5,867,208 A | 2/1999 | McLaren | 725/139 |
| 5,867,625 A | 2/1999 | Mclaren | 386/68 |
| 5,878,168 A | 3/1999 | Kondo et al. | 382/232 |
| 5,912,697 A * | 6/1999 | Hashimoto et al. | 348/12 |
| 5,912,742 A | 6/1999 | Matoba et al. | 348/420 |
| 5,926,611 A * | 7/1999 | Yang et al. | 386/112 |
| 5,929,850 A * | 7/1999 | Broadwin et al. | 345/327 |
| 5,930,400 A * | 7/1999 | Kanda et al. | 382/248 |

* cited by examiner

Primary Examiner—Vu Le
(74) Attorney, Agent, or Firm—Ryan, Mason & Lewis, LLP

(57) ABSTRACT

A selected image view generator is disclosed for generating a selected portion of a larger compressed image. A selected image view from an overall image is generated with significantly reduced computation and reduced latency (for video processing). Frame insensitivity permits selected image views to be formed from static images or from a video stream. Multiple users can simultaneously control a selected view received from an image source. Remote cameras can be panned electronically, rather than physically. The overall compressed image may be encoded using a suitable intraframe macroblock-based image encoder, provided that each macroblock is encoded independently. Each macroblock optionally contains a macroblock identifier indicating the position of the macroblock in a given image. Each transmitted overall image and selected image view optionally includes a frame header indicating the number of macroblocks in the transmitted image. A virtually unlimited number of users can be supported by generating predefined selected image views that have a wider angle (in a panoramic view) or a larger area (for conventional images), than that requested by the user.

57 Claims, 5 Drawing Sheets

US 6,337,882 B1

METHOD AND APPARATUS FOR GENERATING UNLIMITED SELECTED IMAGE VIEWS FROM A LARGER IMAGE

CROSS-REFERENCE TO RELATED APPLICATIONS

The present invention is related to U.S. patent application Ser. No. 09/036,140, entitled "Method and Apparatus for Generating Selected Image Views From a Larger Image," and U.S. patent application Ser. No. 09/036,141, entitled "Method and Apparatus for Generating Unlimited Selected Image Views From a Larger Image Having Dependent Macroblocks," each filed contemporaneously herewith, assigned to the assignee of the present invention and incorporated by reference herein.

FIELD OF THE INVENTION

The present invention relates to image encoding and decoding techniques, and more particularly, to a method and apparatus for generating a partial image from a larger compressed image (or a plurality of individual images).

BACKGROUND OF THE INVENTION

Due to the limited bandwidth of transmission channels, there are a limited number of bits available for encoding image information, such as image information generated by a camera for transmission to one or more remote users. Thus, there are many image encoding techniques available which encode the image information with as few bits as possible using compression techniques, while still maintaining the quality and intelligibility that are required for a given application.

Remote cameras, such as those used for security applications, traffic monitoring or daycare monitoring, are typically panned by physically moving the camera. In addition to the possibility of a mechanical failure, the utility of such remote cameras is limited in that only one user can control the camera at a time. For multi-user applications, however, such limited user control of the camera view is not practical. A number of software techniques have been developed for permitting a number of users to view selected portions of a larger image (or a composite image generated from a plurality of individual images).

Permitting multiple selected views of a larger image, however, becomes more difficult if the larger image is compressed. Specifically, since image data following image compression is of variable length, pixel boundaries are not readily detectable in a compressed image. In addition, since many encoding techniques exhibit intra-frame pixel dependencies, such as encoding the difference values for adjacent DC coefficients under the JPEG standard, the pixel values must be modified when generating a selected portion of a larger image, to reflect the reordering of the subset of pixels in the selected image view.

Typically, when generating a selected portion of a larger compressed image, the larger image must be decompressed into the pixel domain, before the pixel values are reordered and assembled to create each of the selected image views. Thereafter, each of the selected image views are compressed to form the final images transmitted to each user.

The more popular image compression techniques, such as JPEG and MPEG, typically perform three steps to generate a compressed image, namely, (i) transformation, such as a discrete cosine transform (DCT); (ii) quantization; and (iii) run-length encoding (RLE). Likewise, to decompress images using these same image compression techniques, the inverse of the compression steps are performed by the receiver on the compressed image, namely, (i) run-length decode; (ii) dequantization; and (iii) inverse discreet cosine transform (IDCT).

Thus, to create N selected image views from a larger compressed image, conventional techniques require one image decompression, N pixel reorderings, and N compressions. In addition, the processing capacity and bandwidth required to support a unique view for each user in a multi-user application often exceeds the capacities available with current technologies.

SUMMARY OF THE INVENTION

Generally, a selected image view generator for generating unlimited selected portions of a larger compressed image is disclosed. A virtually unlimited number of users is supported by generating selected image views that have a wider angle (in a panoramic view) or a larger area (for conventional images), than that requested by the user. The wider angle (or larger area) images are referred to as "inflated images." Preferably, only the portion of the inflated image that was requested by the user is displayed.

The larger compressed image includes a plurality of macroblocks of image data, encoded using an intraframe encoding technique that encodes the macroblocks independently. The selected image view generator includes a device for storing the larger image; an input for receiving an indication of the selected image view from a user; and a processor configured to (i) identify an inflated image including the selected image view and one or more additional macroblocks of image data; (ii) identify the macroblocks included in the inflated image view; and (iii) assemble said identified macroblocks to form said inflated image view. In addition, the selected image view generator optionally includes an output for transmitting the inflated image view to a user. In one embodiment, the larger image is comprised of a plurality of predefined overlapping inflated images, and the processor identifies the inflated image that includes the selected image view. Another inflated image view is selected for the user when the selected image view is not supported by the current inflated image.

According to an aspect of the invention, multiple users can simultaneously control a selected view received from an image source. The overall image may be comprised of one or more static or real-time images. The selected image from a larger overall image may be used, for example, with a 360° panning camera, to permit each user to select a desired view. For example, different viewers of a tennis match, can watch different players from the same video feed.

The larger compressed image may be encoded using a suitable intra-frame macroblock-based image encoder, provided that each macroblock is encoded independently to ensure that the correlation between DC coefficients is restricted to within a given macroblock. Independent macroblocks may be achieved within the JPEG standard, for example, by initiating the Restart interval for each macroblock. Each macroblock optionally contains a macroblock identifier. Each macroblock identifier initially indicates the position of the macroblock in a given image. The macroblock identifiers are optionally renumbered by the selected image view generator for each inflated image view to indicate the position of the macroblock in the inflated image view. Likewise, the macroblock identifiers are optionally renumbered by the selected image view generator for the selected image view within the received inflated image to indicate the position of the macroblocks in the selected image view. In addition, each transmitted overall image and inflated image view optionally includes a frame header indicating the number of macroblocks in the transmitted image.

An illustrative panoramic image can be horizontally partitioned, for example, to create a plurality of overlapping inflated images. Thus, if the larger image is partitioned into a plurality of predefined 65° inflated images which repeat every 20°, for example, and if a user selects a 45° image view, then the 65° inflated image containing the selected image view can be transmitted to the user. When the user selects an image view of the overall image that is not supported by the current inflated image, the next adjacent inflated image in the direction in which the user is panning is transmitted to the user. Thus, only a limited number of inflated images needs to be supported by the selected image view generator. A given inflated image may be multicast to each user for which the selected image is within the inflated image. By supporting a limited number of inflated images, each user can select a unique image view from all other users, but not require a dedicated image transmission for each selected view.

DETAILED DESCRIPTION

Figure 1A:
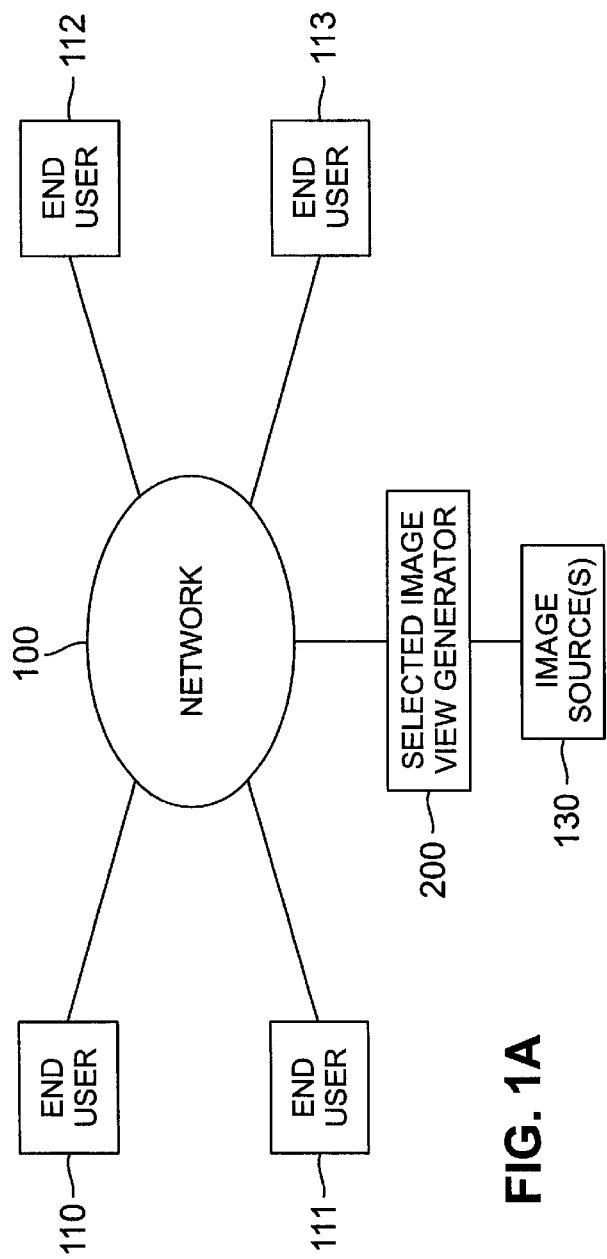
FIG. 1A illustrates a block diagram of a network suitable for transferring information from an image source device to one or more destination devices.
Figure 1B:
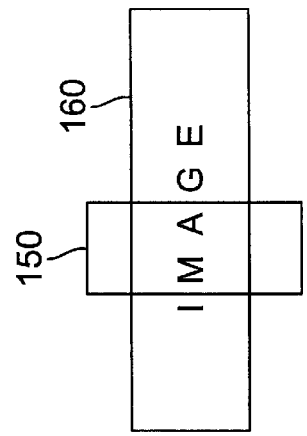
FIG. 1B illustrates a selected image view from an overall larger image.

FIG. 1A shows an illustrative network environment 100 for transferring multimedia information, such as image, video, voice or data information, or a combination of the foregoing, between one or more sources and destinations, such as end users 110–113 and an image source 130. As shown in FIG. 1B, each end user 110–113, such as end user 110, desires to view a selected portion 150 of a compressed image 160. The compressed image 160 is generated by one or more image sources, such as image source 130. The image source 130 may be embodied, for example, as a 360° camera that produces panoramic images, or one or more cameras generating images that may be combined into a composite image. For a detailed discussion of a suitable 360° camera, see U.S. patent application Ser. No. 08/433,356, entitled "Panoramic Viewing Apparatus," assigned to the assignee of the present invention and incorporated by reference herein.

A selected image view generator 200, discussed further below in conjunction with FIG. 2, generates the selected portion(s) 150 of the image 160, shown in FIG. 1B. As used herein, the image 160 includes a composite image generated from one or more individual images. In one embodiment, each user receives the overall image 160, as well as the currently selected image view 150. The transmitted overall image 160 provides the user 110 with an orientation and permits the user 110 to select the desired view 150. For one set of video applications, the overall image 160 can be transmitted at a rate below the standard frame rate, and the currently selected image view 150 can be transmitted at the highest rate permitted by the available bandwidth. In one video implementation, the user selects a viewpoint, and whatever passes in the selected viewpoint over time is presented to the user. In a still image implementation, the smaller selected image view 150 can be presented with a higher resolution than the overall image 160 and/or mapped to a larger portion of the display screen.

The selected image view generator 200 may utilize a variety of image inputs encoded with independent macroblocks, for example, received from a file server, a video-on-demand system or a real-time camera. The network environment 100 may be embodied, for example, as the Public Switched Telephone Network ("PSTN"), the Internet, or other broadband networks, as would be apparent to a person of ordinary skill. In the illustrative embodiment, the end users 110–113 can utilize work stations (not shown), or other general-purpose computing devices, including televisions with set-top terminals (STT).

According to a feature of the present invention, a selected image view 150 from an overall image 160 is generated with significantly reduced computation and reduced latency (for video processing). In addition, the present invention permits selected image views 150 to be formed from static images or from a video stream or both. According to a further feature of the present invention, multiple users can simultaneously control a selected view received from the image source 130. In this manner, a user 110 obtains personalized access to the image source 130.

The image 160 may be encoded using a suitable intra-frame macroblock-based image encoder, such as a JPEG image encoder or an MPEG intra-frame image encoder, as modified herein to incorporate the features and functions of the present invention. In the illustrative JPEG embodiment, each image 160 consists of macroblocks of pixels. Macroblocks are typically a 16×8 or a 16×16 pixel array. Typically, macroblocks are transmitted sequentially from left to right, top to bottom. Thus, for example, 2400 16×8 macroblocks would constitute an entire 640×480 pixel frame. The macroblocks constitute one or more independent color components, which may be at different resolution levels. In the illustrative JPEG embodiment, each illustrative 16×8 macroblock is represented by 2 luminance (Y) blocks and 2 chrominance $(C_b, C_r)$ blocks, with each block containing 1 DC coefficient value, and 63 AC coefficient values.

Under the JPEG standard, the AC and DC coefficients are coded in a different manner. For a detailed discussion of JPEG encoding, see William B. Pennebaker and Joan L. Mitchell, JPEG Still Image Data Compression Standard (Ban Nostrand Reinhold, 1993), incorporated by reference herein. Generally, the DC coefficient is a multiple of the average value in the 8×8 block. Since the average pixel value in any 8×8 block will not differ substantially from the average value in a neighboring block, the DC coefficient values will typically not vary significantly. Thus, in order to achieve further bit rate reductions in the JPEG standard, the differences between adjoining coefficients are typically encoded rather than the coefficients themselves.

In accordance with the present invention, however, each macroblock is encoded independently. Thus, the correlation between DC coefficients is restricted to within a given macroblock. Independent macroblocks may be achieved within the JPEG standard, for example, by initiating the Restart interval for each macroblock. One suitable system for encoding the macroblocks independently is the Montage™ video coding system, being developed by Lucent Technologies Inc, Holmdel, N.J. For a detailed discussion of the Montage™ video coding system, see R. Gaglianello and G. L. Cash, "Montage: Continuous Presence Teleconference Utilizing Compressed Domain Video Bridgin," I.E.E.E.I.C.C. (June, 1995).

Each macroblock optionally contains a macroblock identifier. Each macroblock identifier includes data representative of the position of the macroblock in the image 160. Macroblock identifiers are typically assigned sequentially left to right, top to bottom in each image. The macroblock identifiers are generally specific to each image 160. In some compression standards, such as JPEG, macroblock identifiers arc generally not utilized. In accordance with the present invention, the macroblock identifiers associated with macroblocks in a selected image view 150, if present, are optionally renumbered to indicate the position of the macroblock in the selected image view 150. In addition, each image frame optionally includes a frame header indicating the number of macroblocks in the transmitted image.

Figure 2:
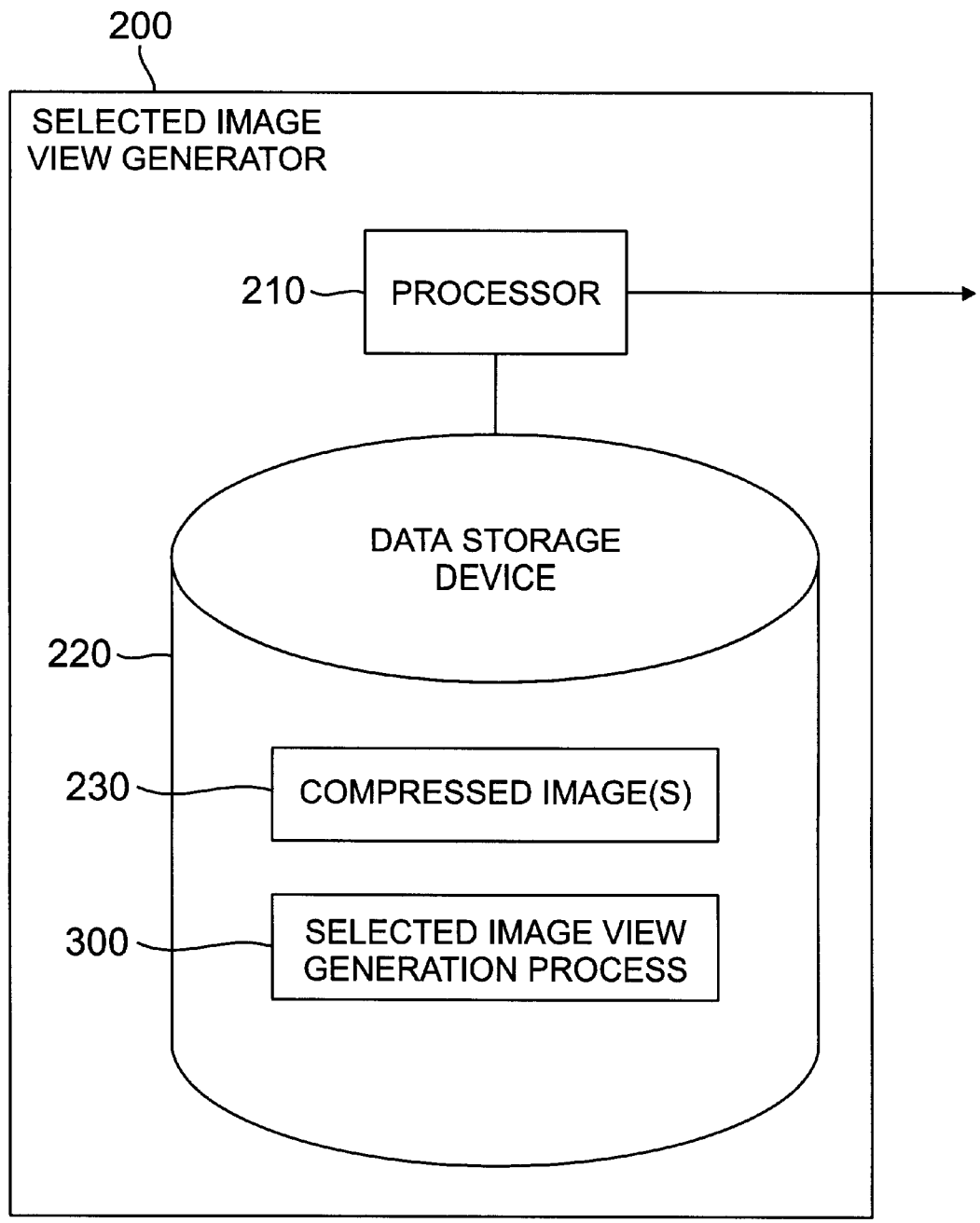
FIG. 2 illustrates one embodiment of the selected image view generator of FIG. 1.

FIG. 2 is a block diagram showing the architecture of an illustrative selected image view generator 200. The selected image view generator 200 preferably includes a processor 210 and related memory, such as a data storage device 220. The processor 210 may be embodied as a single processor, or a number of processors operating in parallel. The data storage device 220 or other memory are operable to store one or more instructions, which the processor 210 is operable to retrieve, interpret and execute.

The data storage device 220 preferably includes an area of memory 230 for storing the compressed image(s) 160. The selected image view generator 200 may receive the compressed image(s) 160 from the image source 130 for processing in real-time or static compressed images may be retrieved from a database of images, such as a video server, as would be apparent to a person of ordinary skill. In addition, as discussed in conjunction with FIG. 3A, the data storage device 220 preferably includes a selected image view generation process 300. Generally, the selected image view generation process 300 (i) retrieves the encoded input image data; (ii) retrieves an indication of the image view selected by the user; and (iii) generates and transmits the selected image view 150 to the user. An alternate implementation of the selected image view generation process 300 is discussed below in conjunction with FIG. 3B.

Figure 3A:
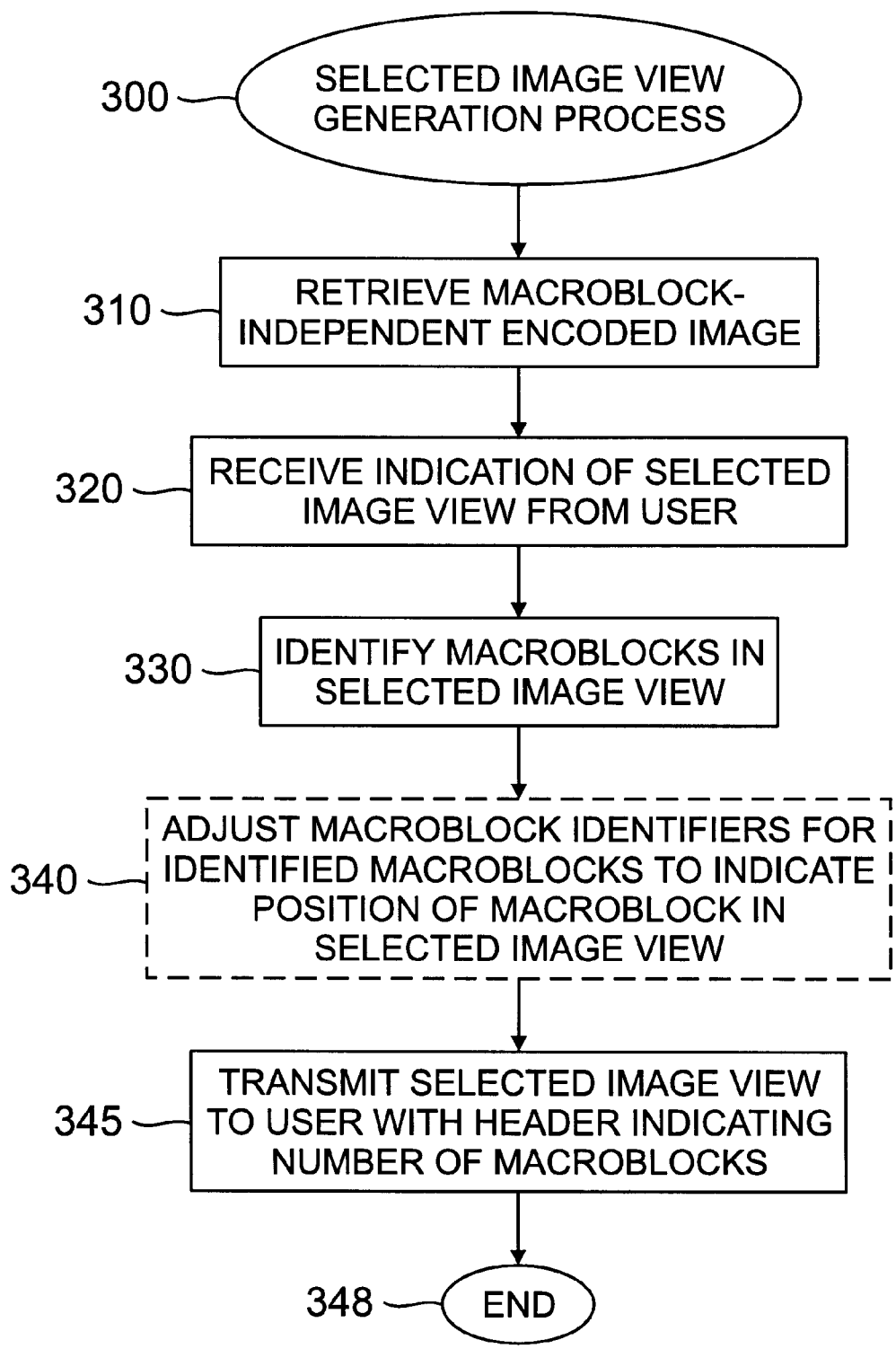
FIG. 3A is a flow chart describing the selected image view generation process of FIG. 2.

As shown in FIG. 3A, the selected image view generation process 300 initially retrieves the image 160 that has been compressed using a macroblock-independent image encoder (not shown) during step 310. The selected image view generation process 300 then receives an indication of the selected image view from the user, such as user 110, during step 320. The user may indicate the selected image view, for example, using a graphical user interface (GUI) to outline the desired region of a larger image displayed on a computer screen. The outline box created by the user using the GUI can optionally snap to the dimensions of the macroblocks, in a known manner.

Thereafter, the selected image view generation process 300 identifies the macroblocks from the overall image 160 during step 330 that are included in the selected image view 150. In an embodiment where each macroblock contains a macroblock identifier (for example, when the images are encoded by an MPEG encoder), the macroblock identifiers associated with the macroblocks identified during step 330 are adjusted during step 340 to indicate the position of each macroblock in the selected image view 150. Finally, the selected image view 150 is transmitted to the user, such as user 110, during step 345, before program control terminates during step 348. The transmitted image preferably includes a header indicating the number of macroblocks in the selected image view 150.

Figure 1C:
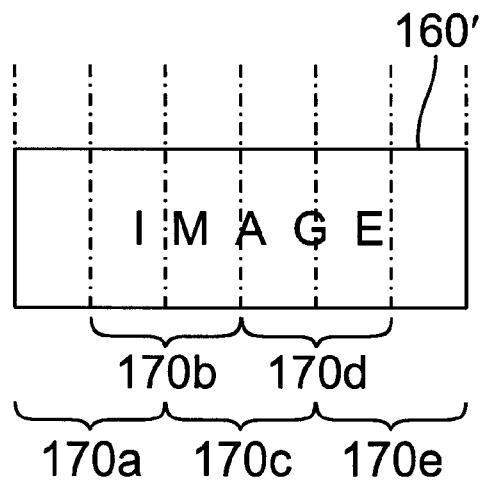
FIGS. 1C and 1D illustrate a plurality of overlapping inflated images in accordance with an alternate embodiment of the present invention.
Figure 1D:
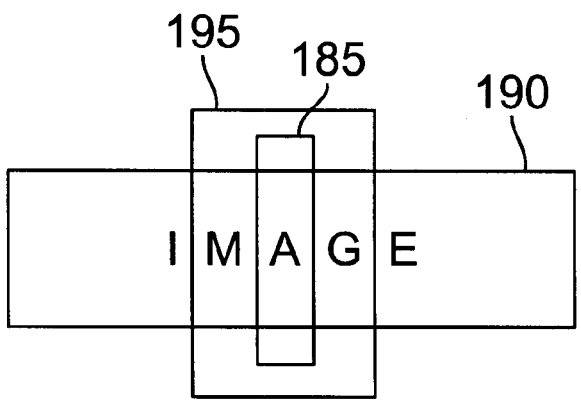

An alternate implementation of the selected image view generation process 300 is discussed below in conjunction with FIG. 3B. In order to support a a virtually unlimited number of users, the selected image view generator 200 can generate predefined selected image views 150 for transmission to a user, such as user 110, that have a wider angle (in a panoramic view) or a larger area (for conventional images), than that requested by the user 110. In this manner, the selected image view generator 200 generates only a limited number of image views, and each user obtains a view within one of the limited number of image views. The wider angle (or larger area) images are referred to herein as "inflated images." As shown in FIG. 1C, an illustrative panoramic image 160 can be partitioned horizontally to create a plurality of overlapping inflated images 170a–170e. For example, a 360° image can be partitioned into a plurality of overlapping 65° inflated images, which start every 20°. Generally, the number of inflated images is equal to the number of degrees in the larger (panoramic) image 160 divided by the difference in degrees between the inflated image and the selected image.

The user receives the inflated image that includes the image view selected by the user. Preferably, only the portion of the inflated image that was requested by the user 110 is displayed. The image decoder initially identifies the selected image view. In addition, the image decoder on the client side preferably renumbers the macroblock identifiers for the selected image view within the received inflated image to indicate the position of the macroblock in the smaller selected image view. The image decoder optionally discards the additional unused macroblocks which are not part of the selected image view. Finally, the image decoder provides the selected image view to the JPEG decoder with an indication of the number of macroblocks in the selected image view, in the illustrative embodiment.

Thus, if a user 110 selects a 45° image 150, then the 65° inflated image containing the selected image view can be transmitted to the user 110. When the user 110 selects an image view 150 of the overall image 160 that is not supported by the current inflated image, the next adjacent inflated image 170 in the direction in which the user is panning is sent to the user.

In this manner, only a limited number of inflated images 170 need to be supported by the selected image view generator 200. A given inflated image 170a–e is preferably multicast to each user for which the selected image is within the inflated image defined for the user 110. By supporting a limited number of inflated images, each user 110–113 can select a unique image view 150 from all other users, but not require a dedicated image transmission for each selected view.

Figure 3B:
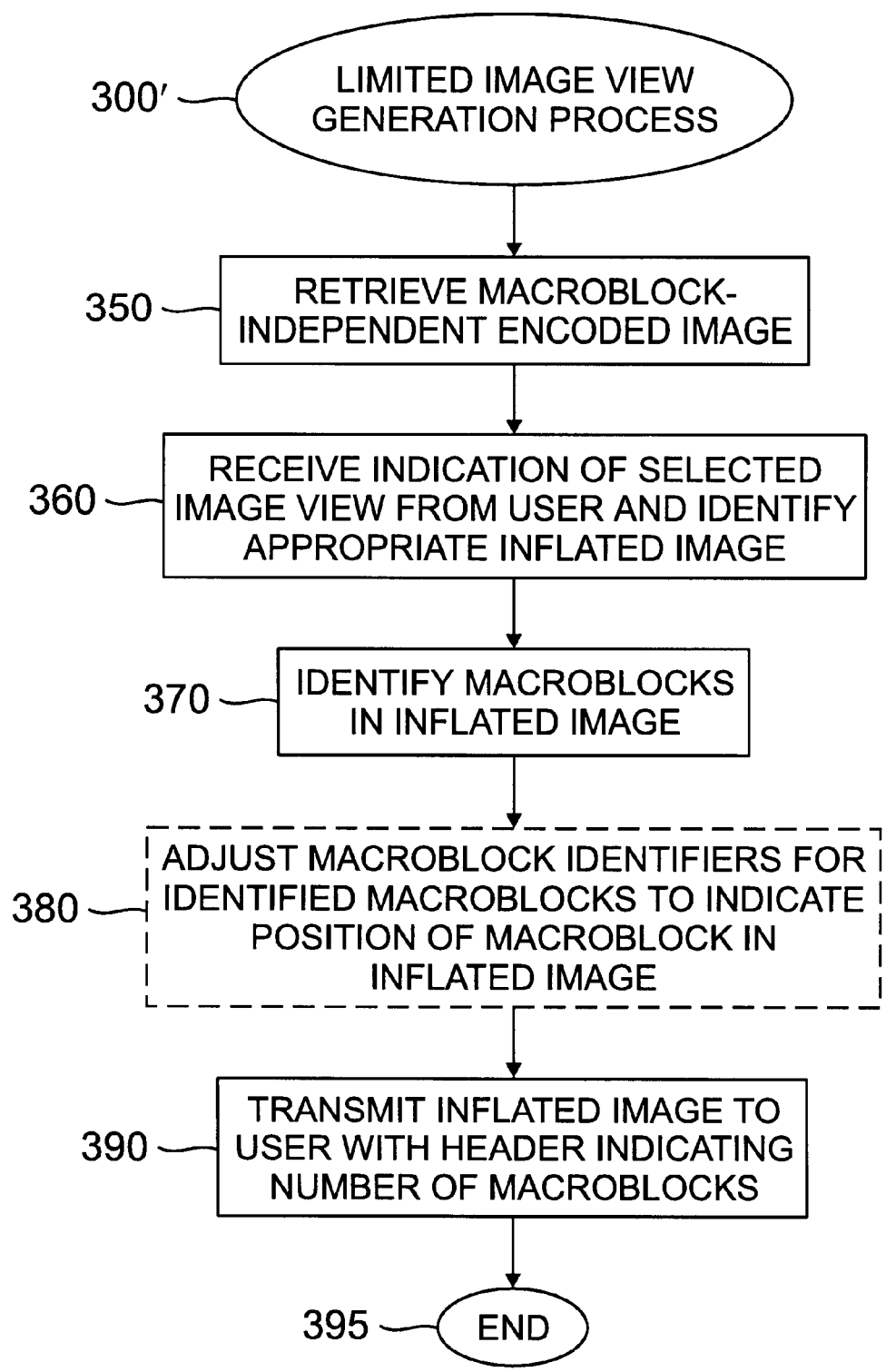
FIG. 3B is a flow chart describing an alternate embodiment of the selected image view generation process of FIG. 2.

As shown in FIG. 3B, the selected image view generation process 300 initially retrieves the image 160 that has been compressed using a macroblock-independent image encoder (not shown) during step 350. The selected image view generation process 300 then receives an indication of the selected image view from the user, such as user 110, during step 360, and identifies the appropriate inflated image to transmit to the user 10. Thus, as shown in FIG. ID, for a given selected view 185 from a larger image 190, the user will receive an inflated image view 195. The user 110 can pan within the inflated image view 195 until a neighboring view is required.

Thereafter, the selected image view generation process 300 identifies the macroblocks within the inflated image view 195 during step 370. In an embodiment where each macroblock contains a macroblock identifier (for example, when the images are encoded by an MPEG encoder), the macroblock identifiers associated with the macroblocks identified during step 370 are adjusted during step 380 to indicate the position of each macroblock in the selected image view 150. Finally, the inflated image view 195 is transmitted to the user, such as user 110, during step 390, before program control terminates during step 395. The transmitted image preferably includes a header indicating the number of macroblocks in the selected image view 150.

The user thereafter receives the inflated image that was transmitted during step 390, and initially identifies the selected image view. In an embodiment where each macroblock contains a macroblock identifier, the macroblock identifiers are preferably renumbered for the selected image view within the received inflated image to indicate the position of the macroblock in the smaller selected image view. Generally, the image decoder will discard the macroblocks which are not part of the selected image view and will provide only the selected image view to the JPEG decoder with an indication of the number of macroblocks in the selected image view.

Further flexibility can be obtained while maintaining a limited number of views by similarly dividing the image vertically, as would be apparent to a person of ordinary skill.

It is to be understood that the embodiments and variations shown and described herein are merely illustrative of the principles of this invention and that various modifications may be implemented by those skilled in the art without departing from the scope and spirit of the invention.

We claim:

1. A method of generating a selected image view from a larger compressed image, said larger image being made up of at least a plurality of macroblocks of image data, said method comprising the steps of:
   encoding said macroblocks independently using an intraframe encoding technique so there is no significant correlation between DC coefficients of adjacent macroblocks;
   receiving an indication of said selected image view from a user, said selected image view being a portion of said larger compressed image;
   identifying an inflated image including said selected image view and one or more additional macroblocks of image data;
   identifying the macroblocks included in the inflated image view; and
   assembling said identified macroblocks from said larger compressed image to form said inflated image view.

2. The method according to claim 1, wherein said larger image is comprised of a plurality of predefined inflated images, and said step of identifying an inflated image comprises the step of identifying said inflated image including said selected image.

3. The method according to claim 2, further comprising the step of selecting a different inflated image when said selected image view is not within the current inflated image.

4. The method according to claim 1, wherein said larger image is divided into a plurality of horizontal inflated images.

5. The method according to claim 1, wherein said larger image is divided into a plurality of vertical inflated images.

6. The method according to claim 1, further comprising the step of transmitting said inflated image view to a user.

7. The method according to claim 1, further comprising the step of including a header with said inflated image view indicating the number of said macroblocks in said inflated image view.

8. The method according to claim 1, wherein each of said macroblocks has an associated macroblock identifier indicating the position of said macroblock in an image.

9. The method according to claim 8, further comprising the step of adjusting said macroblock identifier to indicate the position of each macroblock in the inflated image view.

10. The method according to claim 1, wherein said intraframe encoding technique is JPEG.

11. The method according to claim 1, wherein said intraframe encoding technique is MPEG.

12. The method according to claim 1, wherein said larger compressed image is one image frame in a video stream.

13. The method according to claim 12, wherein the content in said selected image view can change with each frame of said video stream.

14. The method according to claim 1, wherein said step of receiving an indication of said selected image view from a user includes the step of a user using a graphical user interface to outline a desired region of the larger compressed image.

15. The method according to claim 1, further comprising the step of decoding said larger compressed image only enough to detect said macroblocks.

16. The method according to claim 1, wherein said independent macroblocks are obtained by restarting the encoding of said larger compressed image each of said macroblocks.

17. A method of generating a selected image view from a larger compressed image, said larger image being made up of at least a plurality of macroblocks of image data, said method comprising the steps of:
   receiving an indication of said selected image view from a user, said selected image view being a portion of said larger compressed image;
   identifying an inflated image including said selected image view and one or more additional macroblocks of image data, wherein said larger compressed image is encoded using an intraframe encoding technique that encodes said macroblocks independently so there is no significant correlation between DC coefficients of adjacent macroblocks;
   identifying the macroblocks included in the inflated image view; and
   assembling said identified macroblocks from said larger compressed image to form said inflated image view.

18. The method according to claim 17, wherein said larger image is comprised of a plurality of predefined inflated images, and said step of identifying an inflated image comprises the step of identifying said inflated image including said selected image.

19. The method according to claim 18, further comprising the step of selecting a different inflated image when said selected image view is not within the current inflated image.

20. The method according to claim 17, wherein said larger image is divided into a plurality of horizontal inflated images.

21. The method according to claim 17, wherein said larger image is divided into a plurality of vertical inflated images.

22. The method according to claim 17, further comprising the step of transmitting said inflated image view to a user.

23. The method according to claim 17, further comprising the step of including a header with said inflated image view indicating the number of said macroblocks in said inflated image view.

24. The method according to claim 17, wherein each of said macroblocks has an associated macroblock identifier indicating the position of said macroblock in an image.

25. The method according to claim 24, further comprising the step of adjusting said macroblock identifier to indicate the position of each macroblock in the inflated image view.

26. The method according to claim 17, wherein said intraframe encoding technique is JPEG.

27. The method according to claim 17, wherein said intraframe encoding technique is MPEG.

28. The method according to claim 17, wherein said larger compressed image is one image frame in a video stream.

29. The method according to claim 28, wherein the content in said selected image view can change with each frame of said video stream.

30. The method according to claim 17, wherein said step of receiving an indication of said selected image view from a user includes the step of a user using a graphical user interface to outline a desired region of the larger compressed image.

31. The method according to claim 17, further comprising the step of decoding said larger compressed image only enough to detect said macroblocks.

32. The method according to claim 17, wherein said independent macroblocks are obtained by restarting the encoding of said larger compressed image between each of said macroblocks.

33. A selected image view generator for generating a selected image view from a larger compressed image, said larger image being made up of at least a plurality of macroblocks of image data, comprising:
　a data storage device for storing said larger image, said larger compressed image encoded using an intraframe encoding technique that encodes said macroblocks independently so there is no significant correlation between DC coefficients of adjacent macroblocks;
　an input for receiving an indication of said selected image view from a user, said selected image view being a portion of said larger compressed image; and
　a processor to:
　　identify an inflated image including said selected image view and one or more additional macroblocks of image data;
　　identify the macroblocks included in the inflated image view; and
　　assemble said identified macroblocks from said larger compressed image to form said inflated image view.

34. The selected image view generator according to claim 33, further comprising an output for transmitting said inflated image view to a user.

35. The selected image view generator according to claim 33, wherein said processor includes a header with said inflated image view indicating the number of said macroblocks in said inflated image view.

36. The selected image view generator according to claim 33, wherein each of said macroblocks has an associated macroblock identifier indicating the position of said macroblock in an image.

37. The selected image view generator according to claim 36, wherein said processor adjusts said macroblock identifier to indicate the position of each macroblock in the selected image view.

38. The selected image view generator according to claim 33, wherein said intraframe encoding technique is JPEG.

39. The selected image view generator according to claim 33, wherein said intraframe encoding technique is MPEG.

40. The selected image view generator according to claim 33, wherein said larger image is comprised of a plurality of predefined inflated images, and said processor identifies said inflated image including said selected image view.

41. The selected image view generator according to claim 33, wherein said processor selects a different inflated image when said selected image view is not within the current inflated image.

42. The selected image view generator according to claim 33, wherein said larger image is divided into a plurality of horizontal inflated images.

43. The selected image view generator according to claim 33, wherein said larger image is divided into a plurality of vertical inflated images.

44. A selected image view generator for generating a selected image view from a larger compressed image, said larger image being made up of at least a plurality of macroblocks of image data, comprising:
　input means for receiving an indication of said selected image view from a user, said selected image view being a portion of said larger compressed image;
　means for identifying an inflated image including said selected image view and one or more additional macroblocks of image data, wherein said larger compressed image is encoded using an intraframe encoding technique that encodes said macroblocks independently so there is no significant correlation between DC coefficients of adjacent macroblocks;
　means for identifying the macroblocks included in the inflated image view; and
　means for assembling said identified macroblocks from said larger compressed image to form said inflated image view.

45. The selected image view generator according to claim 44, further comprising an output for transmitting said inflated image view to a user.

46. The selected image view generator according to claim 44, wherein said larger image is comprised of a plurality of predefined inflated images, and said means for identifying an inflated image identifies said inflated image including said selected image view.

47. The selected image view generator according to claim 44, wherein said means for identifying an inflated image selects a different inflated image when said selected image view is not within the current inflated image.

48. The selected image view generator according to claim 44, wherein said larger image is divided into a plurality of horizontal inflated images.

49. The selected image view generator according to claim 44, wherein said larger image is divided into a plurality of vertical inflated images.

50. A method of decoding a selected image view from a larger compressed image, said selected image view being a portion of said larger compressed image, said larger image being made up of at least a plurality of macroblocks of image data, said method comprising the steps of:
　receiving an inflated image including said selected image view and one or more additional macroblocks of image data, wherein said macroblocks are encoded using an intraframe encoding technique that encodes said macroblocks independently so there is no significant correlation between DC coefficients of adjacent macroblocks;

identifying said macroblocks in said selected image view within said inflated image; and presenting said selected image view to a user.

51. The method according to claim 50, wherein each of said macroblocks has an associated macroblock identifier indicating the position of said macroblock in an image.

52. The method according to claim 50, further comprising the step of receiving a different inflated image when said selected image view is not within the current inflated image.

53. The method according to claim 50, wherein said larger compressed image is one image frame in a video stream.

54. The method according to claim 53, wherein the content in said selected image view can change with each frame of said video stream.

55. The method according to claim 50, wherein said step of identifying said selected image view within said inflated image includes the step of a user using a graphical user interface to outline a desired region of the larger compressed image.

56. The method according to claim 50, wherein said larger compressed image is decoded only enough to detect said macroblocks.

57. The method according to claim 50, wherein said independent macroblocks are obtained by restarting the encoding of said larger compressed image between each of said macroblocks.

* * * * *